Figure 1:
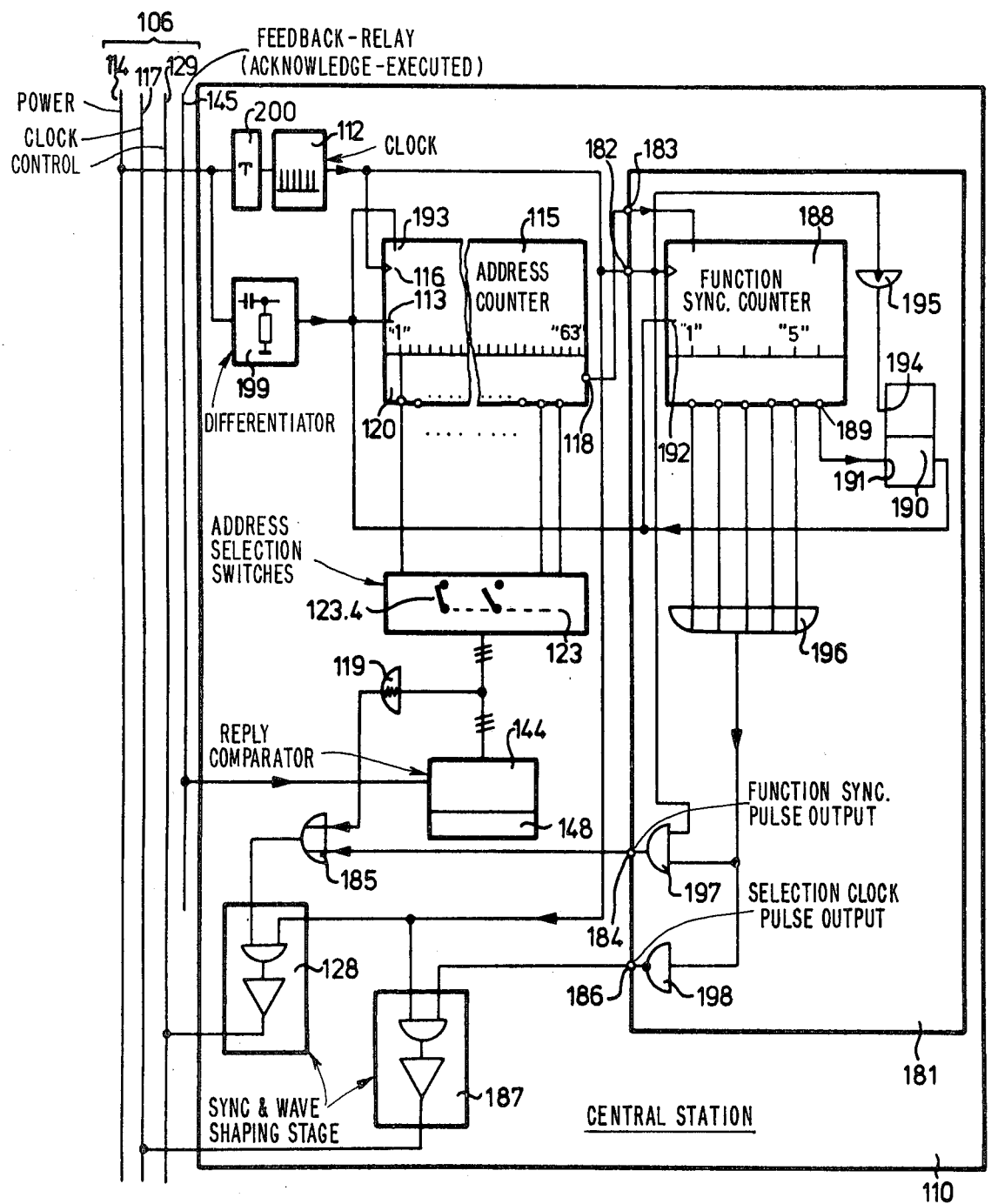

United States Patent [19]

Weckenmann et al.

[11] 4,155,075
[45] May 15, 1979

[54] REMOTE CONTROL SYSTEM FOR SELECTIVE LOAD SWITCHING, SPECIFICALLY FOR AUTOMOTIVE VEHICLES

[75] Inventors: Albert Weckenmann, Ahrensburg; Georg Haubner, Berg, both of Fed. Rep. of Germany

[73] Assignee: Robert Bosch GmbH, Stuttgart, Fed. Rep. of Germany

[21] Appl. No.: 835,180

[22] Filed: Sep. 20, 1977

[30] Foreign Application Priority Data

Sep. 24, 1977 [DE] Fed. Rep. of Germany ....... 2642977

[51] Int. Cl.² .......................................... H04Q 11/04
[52] U.S. Cl. ............................. 340/167 R; 307/10 R; 340/147 SY; 340/168 R
[58] Field of Search ........... 340/167 R, 167 A, 168 R, 340/168 B, 168 S, 147 SY; 328/63, 72, 75

[56] References Cited

U.S. PATENT DOCUMENTS

| 3,048,786 | 8/1962 | Berinson et al. | 340/147 SY |
|---|---|---|---|
| 3,921,168 | 11/1975 | Dunbar | 340/409 |
| 3,943,489 | 3/1976 | Brewster et al. | 340/147 SY |
| 3,946,380 | 3/1976 | Ohnishi et al. | 340/163 |
| 4,019,172 | 4/1977 | Srodes | 340/163 |

*Primary Examiner*—Donald J. Yusko
*Attorney, Agent, or Firm*—Flynn & Frishauf

[57] ABSTRACT

A central station is connected to a ring bus system to which a number of separately addressable loads are connected through specific load receivers. The central station has a switching system by operation of selected switches of which, specific loads can be addressed. The ring bus system has a power line or bus, a clock line or bus, and a control line or bus. The clock line provides clock pulses during a selection cycle, and upon coincidence of a clock pulse with a pulse on the control bus, a specific load associated with a predetermined numbered pulse on the clock line can be addressed by sensing coincidence of the pulse on the control line and on the clock line. To separate selection cycles, a control signal is transmitted which may form a pause of clock pulses on the clock line. This control signal, in accordance with the invention, is represented by a series of pulses transmitted on a line other than the clock line, for example on the control bus. It is generated by a pulse generator in the central station to supply a predetermined number of such pulses on the control line only. The receivers have suitable receiver counters which respond to these pulses. Logic circuitry can distinguish between the selection pulses, which will have coincidence on the clock bus and on the control bus, and clock pulses which will appear only on the clock bus. The synchronization pulses are of a predetermined number which will appear only on the control bus so that the respective function synchronization counters in the central station and in the receiver will be synchronized anew for each selection cycle by digital evaluation of the function synchronization pulses.

11 Claims, 3 Drawing Figures

REMOTE CONTROL SYSTEM FOR SELECTIVE LOAD SWITCHING, SPECIFICALLY FOR AUTOMOTIVE VEHICLES

Reference to related prior application, the disclosure of which is hereby incorporated by reference, and assigned to the assignee of the present application:

U.S. Ser. No. 648,783, filed Jan. 13, 1976, MEIER et al, now U.S. Pat. No. 4,085,403.

Reference to related applications:

U.S. application Ser. No. 836,979, filed Sept. 26, 1977.
U.S. application Ser. No. 840,487, filed Oct. 7, 1977.

The present invention relates to a remote control system for selective load switching, particularly to selectively connect certain desired, specifically addressed loads to a power bus.

German disclosure document DT-OS No. 25 03 679, to which U.S. patent application Ser. No. 648,783, filed Jan. 13, 1976, Werner Meier, now U.S. Pat. No. 4,085,403 assigned to the assignee of the present application corresponds discloses a system in which a central station is provided from which loads can be selectively addressed. The central station, and a plurality of loads are all connected to a bus system which includes a clock line, a power bus, a control bus, and a feedback or reply bus on which signals appear that a certain command is acknowledged and has been executed. A cyclically operated counter is connected to the clock bus to provide cyclical counts. Switching pulses, corresponding to specific count numbers, and occurring in synchronism with the clock pulses on the clock bus are used to address selected loads. The loads, each, have a receiver section in which a counter is provided, stepping in synchronism with the counter of the central station. A decoding circuit, specific for each discrete load decodes coincidence between the pulses on the control bus and the specific count number associated with the load and, upon coincidence of the count number by the counter, the number assigned to the load, and a pulse on the control bus, the load is addressed to carry out a predetermined switching function. Acknowledgement of the switching function is then transmitted coincident with the control pulse on the reply or acknowledgement bus.

Pilot installations have shown that systems of this kind have excellent operating characteristics and are suitable for commercial application.

To separate various addressing or selection cycles, the counter in the central station, and, in synchronism therewith, the counters in the loads provide a pause between count cycles which extends over a plurality of clock pulses. This pause which occurs at the end of the count of the counter is provided for synchronization and to separate the selection cycles during which selective loads are addressed. This pause is in the nature of a separate control signal separating the selection cycles and have a characteristic different from the clock pulses of the selection cycles—it extends over a plurality of clock pulses, or pulses occurring at the rate at which the counter is to count.

THE INVENTION

It is an object to improve a remote control addressing system as above described by further increasing its operating reliability and to so arrange the system that it permits increased utilization of integrated digital circuit elements for its operating components and to eliminate insofar as possible, analog-operating circuits in the synchronization and selection circuitry.

Briefly, a counter which will be termed function synchronization counter is provided in the central station to provide count pulses during the pause separating selection cycles, the count pulses being applied to the bus system; and the receivers to which the loads are connected have a function synchronization detection stage included therein which has a synchronizing counter to respond to the counts of the function synchronizing counter from the central station.

The count pulses separate the selection cycles from each other, and transmit a predetermined number of function synchronization pulses over the bus system to all the receivers. The respective synchronization counters in the receivers are arranged to respond to a fixed predetermined number of these function synchronization pulses; upon occurrence of the function synchronization pulses they then control the remainder of the receiver network to be ready to respond to a new selection cycle, that is, to start a new count to determine which, if any, of the specific receivers are being addressed. The function synchronization pulses thus synchronize all the counters in the receivers to reset to the starting position so that respective receiver counters will be properly addressed.

DRAWINGS

Figure 2:
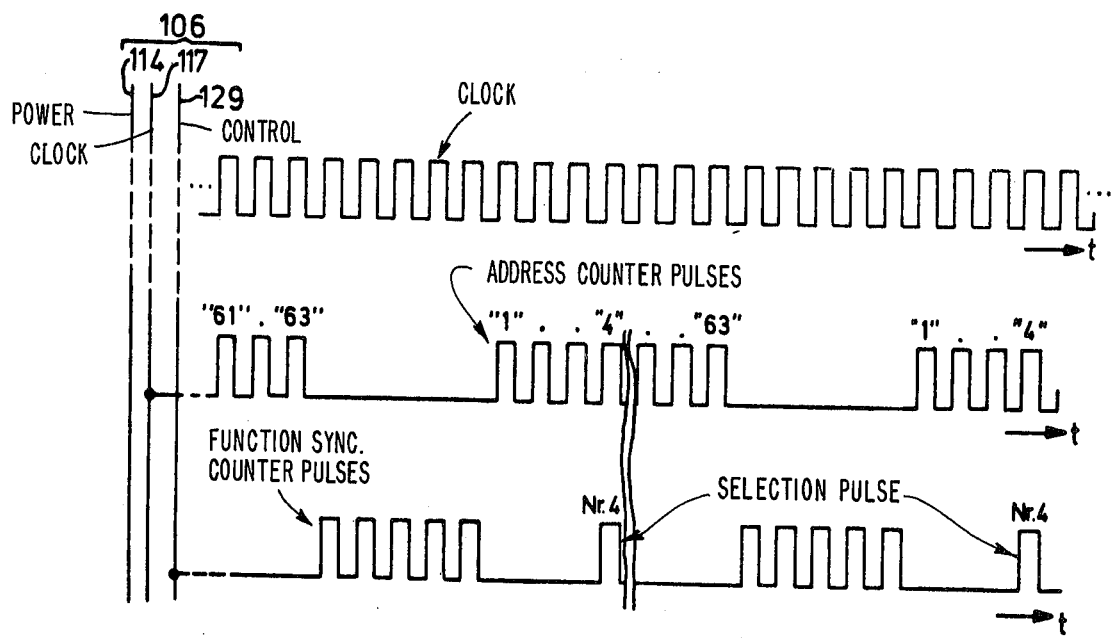
Figure 3:
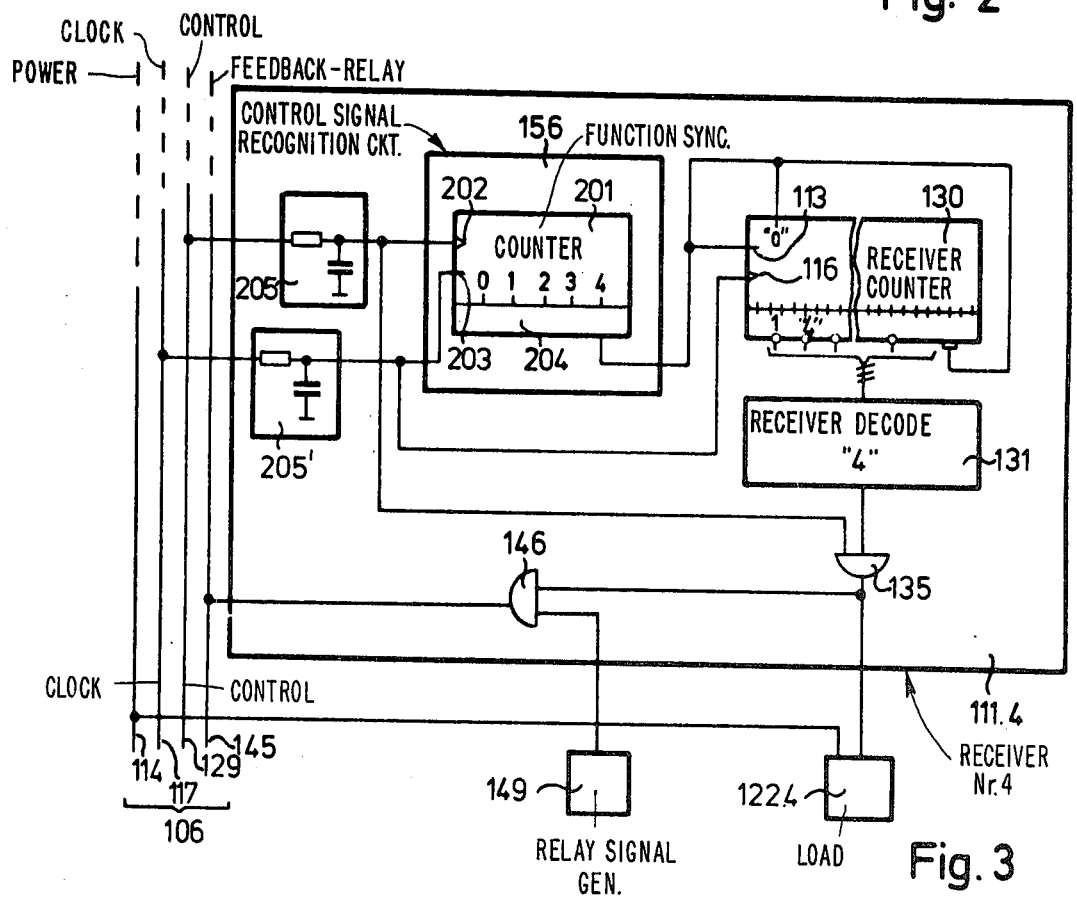

Illustrating an example:

FIG. 1 is a schematic block diagram illustrating the central station connected to a closed, or ring bus system and illustrating a preferred embodiment;

FIG. 2 is a timing diagram associated with the ring bus system 106 and illustrating schematically the pulses occurring at respective lines of the ring bus system, to facilitate explanation of the operation of a system in accordance with FIG. 1, and in which the fourth receiver, or load which has the code number "4" is addressed; and FIG. 3 illustrates a receiver and specifically a receiver which has been assigned no. 4.

The block diagrams of FIGS. 1 and 3 correspond, essentially, to the drawings of the aforementioned German disclosure document DT-OS No. 25 03 679, corresponding to the aforementioned U.S. application Ser. No. 648,783. In that system, the selection cycles are separated from each other by pulse gaps, or pauses between pulses, which is apparent from the middle line of FIG. 2. In accordance with the present invention, function synchronization pulses are applied to the control bus 129 of the bus system 106. The number of these function synchronization pulses is predetermined—see lower graph of FIG. 2.

Insofar as applicable, the reference numerals assigned to the elements in the present application are identical to those of the aforementioned U.S. application. The bus 106 has a power bus 114, a clock bus 117, a control bus 129 and a feedback reply bus on which signals indicative that a command has been acknowledged and executed can appear. The central station 110 has a clock generator 112 which is connected to the count input of an address counter 115. The addressing counter 115 preferably is a binary counter in the form of a shift register, the clock input of which is terminal 116. In the course of a count cycle, discrete count states, or count numbers can be taken off at terminals 120. The terminals 120 are connected to address selection switches 123. Loads are addressed by selectively closing individual switches of the selection switches 123. As shown, switch 123.4, to address the fourth one of the loads is closed. When the counter 115 reaches the count number in any one of its counting cycles, that is, in a selection cycle within the overall operation of the system, an OR gate 119 functioning as a buffer is enabled, which is connected through a wave shaping and synchronization stage 128 to the control bus 129. Stage 128 synchronizes the respective pulse with the clock pulses and provides output amplification. In the example illustrated, the fourth switch 123.4 is closed. Thus, within any one selection cycle, a switching pulse representative of the fourth pulse of the addressing counter 115 is applied to the control bus 129, at the time when the addressing counter 115 is at the "4" number stage. This condition is illustrated in the lowest line of the diagrams of FIG. 2.

As best seen in FIG. 2, each selection cycle is separated from a next subsequent selection cycle by a control signal in form of a pause. In accordance with the present invention, a function synchronization counter is provided in order to furnish pulses during the pause between counts from the addressing counter 115 in order to insure synchronization of all the receivers 111, to which loads 122 are connected. The function synchronization counter 188 forms part of a function synchronization pulse generator 181. Pulse generator 181 has its clock input 182 connected to the output of clock 112. A set input terminal 183 is connected to the highest count number of addressing counter 115, for example to the terminal output 118 representative of no. 63 of a 64-count counter 115. Terminal 118 is the reset, carry or overflow terminal of counter 115.

The pulse generator 181 is, basically, formed as pulse transfer switch and thus, synchronization between the end of a preceding and the beginning of a subsequent count cycle to address counter 115 can use the clock source 112 to effect the counting. This transfer switch has an output terminal 184 connected to OR gate 185 which has its other input connected to OR gate 119 from the address selection switches 123. Alternatively, and as commanded by the logic of stage 181, a second output 186 is activated which is connected to a suitable synchronization, wave shaping and amplifying stage 187 and connected to the clock bus 117 of the ring bus system 106—see middle line of FIG. 2.

The transfer switching function, that is, transfer of output between terminals 184 and 186 is controlled by the function synchronization counter 188. Function sync. counter 188 has a count input connected to terminal 182 of stage 181. The setting input for the first count number is the input terminal 183 of stage 181, and connected to the overflow, or reset terminal 118 of the address counter 115. Both address counter 115 and function synchronization counter 188, preferably, are shift registers, preferably binary counters. In actual construction, they can be combined in one unit, with suitable decoding to provide the respective output pulses. The number of the discrete counts, or count stages which the function synchronization counter 188 can assume is higher by one than the number of pulses which otherwise would occur during pauses between addressing cycles, that is, which would occur during the period of time that the selection cycle control signals occur on the clock 117. The output circuit 189 from the function synchronization circuit determines when the counter 188 has reached its last count state. When terminal 189 is enabled—function synchronization counter 188 having counted through one cycle—then a bistable flip flop (FF) 190 is set over its SET input 191. The output from FF 190 resets the function synchronization counter 188 by enabling its RESET terminal 192. Additionally, the address counter 115 is reset be enabling its RESET terminal 113. Simultaneously, address counter 115 is set to commence counting by enabling the SET terminal 193 of address of counter 115. The bottom line of FIG. 2 does not show the last count state of the function synchronization counter 188 by which it cancels itself. However, the center line of FIG. 2 illustrates the beginning of the new count cycle of the address counter 115 with account number 1.

The RESET input 194 of the FF 190 is connected to the clock input 182 of stage 181, so that it is controlled by the clock source 112. Preferably, the RESET input 194 has a dynamic switching stage 195 connected serially in advance thereof so that the FF 190 is reset as soon as the clock pulse terminates which has led to the highest count state of a function synchronization counter 188, and hence to resetting of the function synchronization counter 188.

Upon resetting of a function synchronization counter 188 at the termination of the control signal which, in accordance with the above mentioned earlier application corresponds to a pulse pause, and which also corresponds to the beginning of the next subsequent selection cycle of the address counter 115, by changing state of the FF 190, clock pulses which continue to be applied to the clock input 182 will be blocked from causing the function synchronization 188 to count. Rather, the counter 188 will begin to count only when the highest count number of the address counter 115 is reached, the transfer output 118 of which providing an output to the set, or count command input over terminal 183 which sets the first count state into the function synchronization counter 188. Only then will further clock pulses from the clock source 112 be counted in the function synchronization counter 188. Thus, the counters 115, 188 operate in alternating cycles—when counter 115 counts, counter 188 is idle; when counter 115 has reached its highest count state, as determined by an output at terminal 118, function synchronization counter 188 can commence to count.

In the example illustrated, and corresponding to a preferred embodiment in accordance with the invention, five synchronization pulses are derived from synchronization counter 188 during the pause in address pulses. These five synchronization pulses are applied to the control line 129, and occur, therefore, during gaps in pulses on the clock line 117 (center graph of FIG. 2). The sixth count pulse from function synchronization counter 188, which does not appear at the output circuit 189 of the counter 188 corresponds to the start of a new selection cycle. The output 189 of the function synchronization counter 188 is connected through an OR gate 196 to an AND gate 197 which, in turn, is connected to the function synchronization pulse output 184 of stage 181. The second input of the AND gate 197 is directly connected to the clock 112 through terminal 182 to provide proper pulse synchronization.

The OR gate 196 is additionally connected to an inverter 198. The output of the inverter, thus, will be active only if none of the five count states from function synchronization counter are enabled. The output from inverter 198 is connected to the selection clock output 186 of stage 181 and to an AND input of the synchronization and wave shaping stage 187, enabling the AND gate and permitting pulses to be applied from the clock 112 to the clock bus 117.

Let it be assumed that the system is installed in an automotive vehicle. Upon beginning of operation, for example upon closing of the ignition switch, a voltage of increasing magnitude will appear on power bus 114. In case of an automotive vehicle, this voltage will, essentially, be battery voltage. The rising voltage flank is sensed by a differentiator 199 which provides a pulse which sets the counter 115 to count state one, while resetting, or cancelling any number in the function synchronization counter 188. The differentiator 199 which, as shown, may be a C/R network is so dimensioned that only voltage jumps which occur practically only when the ignition switch is operated, thus energizing bus 106, will reset the counter. A timing circuit 200 is connected serially in advance of clock 112 so that the first clock pulse at the output of clock generator 112 can occur, upon energization of the bus network 106 only when the counters have been controlled already by the differentiated pulse from differentiator 199. Additionally, the delay of timing circuit 200 should be such that it permits transients to dissipate themselves so that the conditions of operation of the system and on the bus system 106 will be stable.

The receiver is illustrated in FIG. 3. Any one of the receivers 111, and in particular the fourth receiver 111.4, has a load 122, the specific load 122.4 attached thereto. This load 122.4 is selected when the switch 123.4 is set in a selection position. To control the receiver, and hence the load 122.4, the selection cycle as counted by the counter 115 is interrogated by the switch 123. The setting of the switch 123.4 causes the fourth switching pulse, that is, the switching pulse number 4 to be applied to the control bus 129 of the bus system 106. The switching pulse number 4 will be coincident with the respective clock pulse on bus 117, as graphically illustrated by the center and lower lines of FIG. 2. Each one of the receivers 111 has a control signal recognition circuit or discriminator 156 connected to the control bus 129. The control signal recognition circuit 156 provides for synchronization of the receiver counter 130 during two succeeding selection cycles by resetting the counter in the initial state when the selection cycle commences by recognizing the control signal which separates each selection cycle.

In accordance with the present invention, the control signal which separates the selection cycles is defined by a plurality of function synchronization pulses appearing on the control bus 129. Accordingly, the control signal recognition circuit 156 essentially includes a synchronizing counter which, with respect to its construction and count dimensioning, corresponds essentially to the function synchronization counter 188 in the central station 110. The receiver function synchronization counter 201 has a count input 202 which is connected to the control bus 129 over an integrator 205. Its reset input 203 is connected to the clock pulse 117 of the ring bus system 106. Counters of this type provide for priority of the reset input 203 with respect to the count input 202. Thus, up-counting is not possible if both inputs have simultaneously occurring pulses thereon, or pulses which overlap. Thus, switching pulses appearing on the control bus 129, for example in FIG. 2 the control pulse "4" could not lead to up-counting of the synchronization counter 201 since, as noted, such switching pulses would be coincident each time with a clock pulse on the clock pulse line 117. If, however, the control bus 129 has pulses thereon which do not coincide with the clock pulses on the clock line 117, then these pulses are function synchronization pulses, as illustrated on the central and bottom line of FIG. 2. The duration of the pause in the clock pulses represents a control signal which is depicted at the receiver to synchronize the receiver counter 130 upon transition between two succeeding selection cycles.

This synchronization, that is, the resetting of the receiver counter 130 is effected by sensing the fourth and fifth function synchronization pulses from the synchronization counter 201 over its decoding output stage 204. These last pulses are applied to the reset input 113 of the receiver counter 130. The receiver counter 130 thus is prepared for a new selection cycle only if a sequence of at least four function synchronization pulses appeared on the control line 129 without a clock pulse appearing on the clock line 117. If, for example, due to extraneous noise pulses more pulses should appear during the pause of clock pulses on line 117 then this is not detrimental to preparation of the receiver counter 130 to commence counting upon the next selection cycle. If, however, stray pulses should appear outside of the time span of the control signal on the control line 129, then the synchronization counter 201 will count those pulses but, upon occurrence of the next pulse on line 117, the synchronization counter 201 is reset. Upon suitable dimensioning of the number of the function synchronization pulse from counter 188, that is, corresponding to the various discrete count positions of the receiver synchronization counter until the reset input 130 of the receiver counter is enabled, noise or other stray pulses will not result in erroneous operation, since the synchronization counter 201 could not count down to the subsequent clock pulse on the clock line 117 until the next clock on the clock line 117 has occurred.

Thus, before each selection cycle, this receiver counter 130 is synchronized with the address counter 115 in the central station and is set to the initial count position. When the fourth count state of the selection cycle is reached, the conditions for coincidence are satisfied and the coincidence circuit 135 will respond. The output from the receiver counter 130 is applied to a receiver decoding stage 131 which ignores all count states of counter 130 except the fourth. The decoding stage is specific to the specific receiver. Consequently, since the coincidence stage 135, which is in its simplest form an AND gate has been enabled, the load 122.4 will be controlled, as explained in detail in the above referred to disclosure document and U.S. Patent application. The load can be a typical load which is present in automotive vehicles such as a light, motor, such as a heater blower, or the like. It may, however, also be a measuring or supervisory unit or a remote control sensing arrangement, for example a temperature gauge which is enabled to provide an output indicative of its sensed state. Simultaneously, the feedback reply bus 145 is enabled. The central station 110 includes a reply comparator 144 and a reply acknowledgement indicator 148. The receiver 144 has a reply signal generator 149 which provides a signal indicative that the commanded function has been carried out and provides an acknowledgement-executed signal which, through AND gate 146 energizes the reply bus 145. The other terminal of AND gate 146 is enabled together with control of the load to unblock the otherwise blocked AND gate 146 to apply the signal from the reply signal generator 149 to the reply bus 145.

Reliability of rejection against stray or noise pulses on the control line 129 can be increased by providing the integrator 205, which is not strictly necessary. At least the count input 202 of the synchronization count 201 should have an integrator in series therewith. Preferably, the reset input 203 also has an integrator 205' connected in advance thereof. Integrators 205, 205' prevent transmission of peaked needle pulses which, typically, are noise pulses. The time constants of the integrators 205, 205' are so selected that noise pulses which may affect the receiver 111 must have a minimum amplitude in the order of magnitude of the clock, or control pulses and at least a somewhat similar voltage-time integral curve. Thus, the integrators are dimensioned to sense, essentially, the predetermined pulses which are derived from the clock source 112 and through the clock source 112 the counters 115, 188, but reject other types of pulses. Preferably, the integrators 205 are R/C circuits and have somewhat different time constants so that a clock pulse on line 117 and transmitted by integrator 205' becomes effective just slightly in advance of the associated switching pulse on line 129 transmitted through integrator 205. The reverse arrangement is also possible.

Various changes and modifications may be made and reference is made to the aforementioned German disclosure document and corresponding U.S. patent application in which such changes and modifications are described. The disclosure of the earlier application is incorporated in the present by reference and, therefore, to avoid repetition, no further discussion will be given herein.

The only analog-type networks used in the system of the present application are the differentiator 199 and the timing or delay circuit 200 in the central station 110 to insure that the initial state of the system start from a predetermined condition. The integrators 205 in the receiver 111 to suppress the stray spike pulses and the like also are analog-type networks which may be used. Other than the elements 199, 200, 205, 205', no further analog-elements are necessary. Decoding of the control signal separating the selection cycles and the synchronization of receiver and transmitter so that the counting in the receiver and transmitter will proceed in synchronism is carried out by digital elements which can be constructed in economical, small and reliable elements, for example in completely integrated circuits. Preferably, the system is carried out in COS-MOS technology. This has the advantage that the digital connections operate reliably and reject stray or noise pulses, since the switching level of C-MOS gates typically is at 0.45 $U_B$. When using the remote control system in an automotive vehicle having a 12 V on-board network, that is, twelve volts on the power bus 114, then all stray or noise pulses having an amplitude less than 5 V are reliably suppressed due to the response characteristics of the respective circuit elements. Experiments have shown that noise or stray pulses of higher voltage hardly ever occur if the sensor station 110 has a low resistance output. The statistically rarely occurring stray noise pulses can be suppressed reliably by the integrators 205, 205'. If, in spite of the circuits 205, 205', stray noise pulses having a substantial voltage-time integral should occur, then the connection of a reset input 203 of the synchronizing counter 201 in the respective receivers to the clock line 117 provides for suppression before the operation of the receiver counter 130 can be affected. Additional interference rejection is obtained by self-synchronization of each receiver counter 130 by feeding back the highest possible count state of the receiver counter 130 to its reset input 113. This feedback connection is shown in FIG. 3.

The control signal, that is, the pause in clock signals which is replaced by the function synchronization pulses derived from stage 181, and specifically from the function synchronization counter 188 can be applied over any suitable line within bus system 106. For example, the bus system 106 may have an additional synchronization bus (not shown) added thereto. In a preferred embodiment, however, and as explained, it is not necessary to provide an additional wire line in the bus system 106 because the arrangement of the coding between the clock pulses on the clock line 117 and the function synchronization pulses on the control line 129 can, itself, provide for separation, if the number of pulses representative of function synchronization is predetermined and standard for the system.

Using the clock line 117 and the control line or bus 129 in the manner explained in the aforementioned application Ser. No. 648,783 permits operating the system with two succeeding pulse trains. This is the preferred form of operation since the number of wires and hence the wiring connections and costs are minimized. Forming the stage 181 as a pulse train switch which selectively applies the clock pulses either to the clock line 117 or to the control line 129, in accordance with the desired function to form, respectively, selection pulse synchronization pulses or function synchronization pulses is a preferred solution resulting in a particularly and trouble-free and interference-free operation.

The control bus 129 thus, during any one cycle of the operation, and specifically during the selection period of the operating cycle provides switching pulses which are determined by the setting of the address selection switches in synchronism with pulses on the clock line 117. The pulse pause on the clock line forming a control signal, that is, the pause between succeeding selection cycles then permits applying to the control line a predetermined number of function synchronization pulses.

In the receiver, the synchronizing counter 201 is so arranged that it cannot count up upon occurrence of just any pulse on the control line 129. This is due to the arrangement of functional priority which the reset input 203 has over the count control, or count commence input 202. The count commence input 202, in shift registers, corresponds to the clock input. Simultaneous occurrence, or approximately simultaneous occurrence of a selection pulse, which will occur both on the clock bus 117 and on the control bus 129 prevents counting of the synchronization counter 201 since the reset input 203 is enabled effectively simultaneously—over clock line 117—with the count input terminal 202—over control bus 129. During the control pulse, that is, during the absence of clock pulses on clock line 117, there will be pulses only on the control bus 129. Since there will non-coincidence of pulses on the clock line 117 and on the control bus 129—due to the absence of the clock pulses on line 117—the synchronization counter 201 can count up until, at the end of the count, the receiver counter 130 is reset to provide, at the same time, synchronization of the receiver counter for the next selection period, or selection cycle. If the pulses which are not synchronized with clock pulses should be noise or interference pulses, then since they statistically and usually will not cause the counter to count to its end position until the next regular clock pulse occurs, which would cause resetting of the synchronization counter, they will have no effect on the receiver counter 130.

Synchronization at the receiver, therefore, permits detection of the control signal—formed by a gap in pulses on the clock bus 117—no longer as a function of time, requiring for example a time-responsive element but rather permits use of digital circuitry which can readily be made in integrated circuit form with a further enhanced reliability of operation and rejection of stray noise or interference pulses.

Various changes and modifications may be made within the scope of the inventive concept.

We claim:

1. Remote control system for selection of at least one of a plurality of selectively switchable loads (122) from a central station (110) comprising a bus system (106) having a clock bus (117) and a load switching control bus (129), connected to the central station (110) and to the switchable loads;

the central station having a clock source (112);
a cyclically operated address counter (115), controlled by the clock source (112), the address counter (115) selecting from said clock pulses a train of a predetermined number of clock pulses to form a selection cycle and a control signal separating sequential selection cycles;
means (187) controlled by the address counter (115) connecting clock pulses to the clock bus (117) during a selection portion of the selection cycle and blocking pulses from the clock bus during another portion to thereby form a control signal, defined by a pause in the clock pulses on the clock bus (117) within the selection cycle extending over a predetermined number of clock pulses;
a plurality of selectively operable load control switch means (123) to selectively address selected loads and command occurrence of a switching function, the load switch means decoding selected selection pulses corresponding to selected counts of the address count (115) during any selection cycle, for application of said selected pulses to the control bus (129) to address a selected load (122);
the loads (122) each including a receiver (111) connected to the clock bus (117) and the load switching control bus (129) and having a receiver counter (130) connected to and counting in synchronism with clock pulses on the clock bus (117) and a decoding circuit (131, 135) connected to the counter and decoding the count of the counter and being responsive to the address of the selected load; and wherein
the selection pulses as determined by said selectively operable load control switch means (123) are transmitted over the control bus (129) during the selection portion of the selection cycle in synchronism with the clock pulses on the clock bus (117),
said system comprising, in accordance with the invention,
in the central station, a pulse generator (181) connected to the bus system (106) to provide function synchronization pulses, the pulse generator being enabled during the control signal separating sequential selection cycles;
controlled switch means (197, 198) connected to the clock bus (117) and to the control bus (129) and (a) operable during the selection portion within a selection cycle to connect clock pulses from said clock source (112) to said clock bus (117) and (b) further operable to connect a predetermined number of clock pulses during the control signal portion within the selection cycle formed by the control pause to said control bus (129);

and, in each load receiver (112), a function synchronism detection state (156) including a synchronizing counter and connected to the control bus of the bus system to count in synchronism with the pulses derived from the pulse generator (181) in the central station.

2. System according to claim 1, wherein the address counter (115) in the central station is disabled during the occurrence of the control pause forming the control signal;

and wherein the receiver counter (130), consequently, and during absence of the clock pulses during the control pause, is idle.

3. System according to claim 1, wherein the pulse generator includes a function synchronization counter (188) counting a predetermined number of clock pulses applied thereto from the clock (112) and providing said predetermined number of clock pulses to the control bus during occurrence of said control signal and when the transfer switch is connected to the control bus;

and wherein, in each receiver, a decoding counter (156; 201) is provided, connected to the control bus (129) and sensing occurrence of said predetermined number of function synchronization pulses derived from the function synchronization counter (188) in the central station and providing a synchronization signal to the receiver counter (130) when the receiver synchronization counter (201) has reached a predetermined count number as controlled by the function synchronization pulses on the control bus (129).

4. System according to claim 3, wherein the receiver synchronization counter (201) has a count input (202) connected to the control bus (129), has a reset input (203) connected to the clock bus (117), and has a count output terminal (204), the count number of which corresponding to the predetermined number of function synchronization pulses being connected to the reset input (113) of the receiver counter (130) to reset the receiver counter (130) each time when the receiver synchronization counter (201) has counted through a count cycle.

5. System according to claim 3, wherein the function synchronization counter (188) in the central station has a count output of its highest count number (189) connected to reset the address counter (115) and to reset itself at its reset input (192) to synchronize the beginning of counts of the address counter upon the function synchronization counter (188) reaching the highest count;

an OR function gate (196) being connected to the count outputs of the function synchronization counter other than the highest count number;
and means (197, 185, 128) connecting the output of the OR function gate (196) to the control bus (129).

6. System according to claim 5, further comprising a bistable stage (190) connected to the highest count output (189) of the function synchronization counter (188), and connection means (195) connecting the reset input (194) of bistable element (190) to the clock (112).

7. System according to claim 1, wherein the pulse generator (181) includes a function synchronization counter (188);

and wherein the function synchronization counter and the address counter (115) comprise shift registers;

a differentiating circuit (199) connecting the reset inputs to a source of supply (114);

the count inputs (113, 192), respectively, of said address counter and said function synchronization counter being connected to the clock (112) to reset the counters upon first energization of the system by a differentiated switching pulse before the the clock (112) can cause stepping of the counters;

and wherein the address counter (115) has its count number output (118) is connected to the count command terminal (183) of the function synchronization counter, and wherein the count command input (193) of the address counter (115) is further connected to the reset input (113) of the address counter (115) to permit the address counter to start counting immediately upon disappearance of a signal on the reset input (113).

8. System according to claim 1, further comprising a memory circuit (190) connected to the highest count output (189) of the function synchronization counter (188) and providing a reset signal to the reset input (113) of the address counter when the function synchronization counter (188) has counted through a count cycle.

9. System according to claim 8, wherein one of the integrating circuits (205') and associated with one of the bus lines (117) has a slightly shorter time constant, or energy level response characteristic than the other integrating circuit (205) and connected to the other bus (129).

10. System according to claim 1, further including integrating circuits (205, 205') connected in advance of the receiver synchronization counter (201) between the respective count input terminal (202) of the receiver synchronization counter (201) and the control bus, and between the reset input (203) of the receiver synchronization counter (201) and the clock bus (117) to filter short-time noise pulses having an energy content substantially different from the pulses commanded by the central station on said buses.

11. System according to claim 1, wherein the count input terminal (116) of the receiver counter (130) is connected in parallel with the reset input (123) of the receiver synchronizing counter (201); and the reset input has priority.

* * * * *